June 3, 1924.  1,496,258
A. L. EWING
DEVICE FOR COUNTING TIME
Filed Nov. 27, 1922
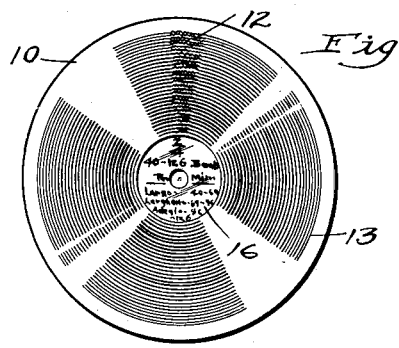
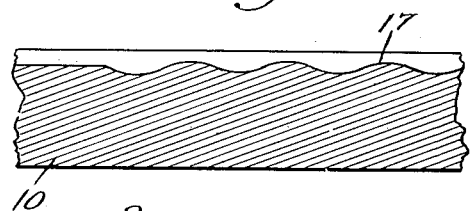
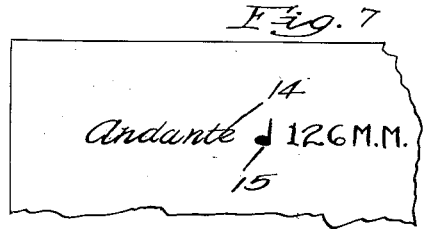
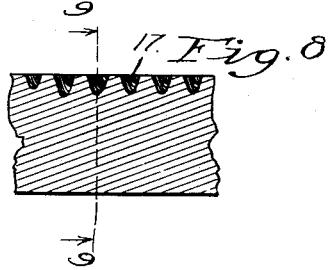
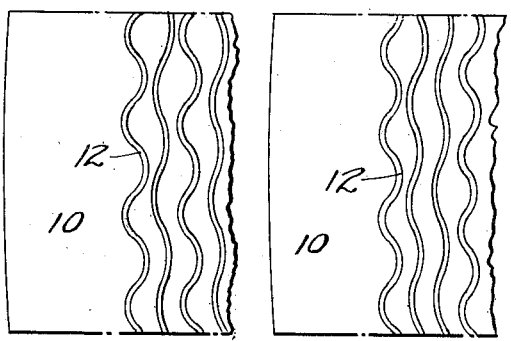
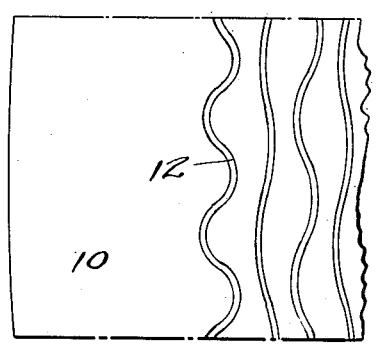
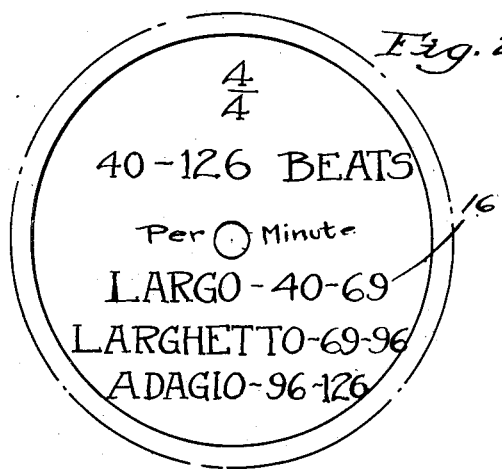
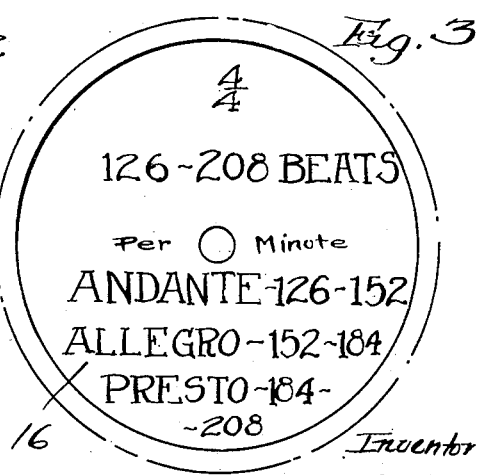

Patented June 3, 1924.

1,496,258

UNITED STATES PATENT OFFICE.

ADELAIDE L. EWING, OF DES MOINES, IOWA.

DEVICE FOR COUNTING TIME.

Application filed November 27, 1922. Serial No. 603,515.

*To all whom it may concern:*

Be it known that I, ADELAIDE L. EWING, a citizen of the United States, and a resident of Des Moines, in the county of Polk and State of Iowa, have invented a certain new and useful Device for Counting Time, of which the following is a specification.

An object of my invention is to provide a simple device for counting the time for a student of music while practicing.

A further object is to provide such a device which will be of such character as to attract the attention of the pupil.

Another object is to provide in such a device, means for accenting certain beats in a measure.

More specifically, it is my object to embody such a device in a phonograph record wherein the beats may be expressed by means of a human voice, a triangle, a combination of the two, or by means of any sound which will be individual enough in character to attract the student's attention.

In addition to the foregoing objects, it is contemplated to provide on the record, means whereby the timing of the beats may be regulated and determined by the use of the speed regulator on the phonograph.

Figure 1 is a plan view of a phonograph record embodying my invention.

Figure 2 is a view of a central portion of a record, illustrating a table which may be printed on the record, whereby a tempo expressed on the music in words may be translated so as to enable a student to set the phonograph at the proper speed.

Figure 3 shows the central portion of the reverse side of the record shown in Figure 2.

Figure 4 is an enlarged view of a portion of a record wherein every other beat is accented.

Figure 5 is an enlarged view of a portion of the record wherein every third beat is accented.

Figure 6 is an enlarged view of a portion of a record wherein one beat is accented and another beat is slightly accented.

Figure 7 shows a portion of a sheet of music upon which the tempo is expressed in two different forms.

Figure 8 is a sectional view of a record wherein the vibrations are produced vertically; and Figure 9 is a sectional view of the same taken on the line 9—9 of Figure 8.

It is well known to instructors of music that the metronome commonly used in beating time, has various faults which render it an imperfect instrument for the purpose, for instance, the sound produced by the metronome is a regular ticking like that of a clock and this becomes monotonous to the ear of a student using the instrument, until finally, the student is likely to disregard it entirely.

In directing the time of a piece of music, it is sometimes almost essential to accent the first beat of a measure and the metronome will not satisfactorily accomplish this. The various parts of the metronome are likely to become rusted and slightly distorted from the action of the weather, and its operation will be thereby impaired; that is, for slow tempos, the swinging pendulum is likely to be so affected as to either cause it to oscillate at a slower rate of speed than it should, or to refuse to oscillate altogether.

On account of its shape and size, it is found that the metronome is always in the way of the instructor and is, therefore, very inconvenient.

If the metronome is placed so that it is not in a vertical position, the pendulum will oscillate irregularly, the time between one pair of beats being greater or less than between the next pair. It has been my object to devise a counting mechanism which will obviate these difficulties.

My idea consists essentially in the making of a phonograph record, having impressions of some distinguishable sound disposed at regular intervals along the groove of the record so as to cause beats to be produced.

In Figure 1, I have shown such a record and used the reference numeral 10 to indicate the body of the record. The record has the groove 11 formed in a uniform spiral. The groove 11 is broken by the sound impressions 12 which cause the groove to assume a wavy shape, as illustrated in Figure 4.

It will be understood that the impressions 12 may be so timed when the record is made as to be distributed at various points over the record but I find that it is more practical to time the impressions so that there will be one, two, or three impressions to the revolution of the spiral groove 11. By so doing, the number of beats which are produced when the record is played will either coincide with, or double, or treble the number of revolutions of the turn table of the machine.

The number of revolutions of the turn table per minute can be determined by the use of the speed regulator of the machine. Ordinarily, it is possible to vary the number of revolutions of the turn table from about 40 to 126 revolutions per minute, the average operation being about 78 revolutions per minute.

In reading music, the tempo may be expressed by means of the word andante or largo or other similar expression, as shown at 14 in Figure 7, or may be expressed by means of a note (as at 15) and the characters 126 MM. Translated this latter may mean "126 metronome" or "126 beats per minute with one beat to a quarter note" (providing the quarter note is the note shown at 15). In some cases, the tempo may be expressed by both of these methods and in other cases, it may be expressed by either method alone. If the tempo is expressed by the latter means, the student needs only to set the indicator of the machine at the number of revolutions expressed on the music, and the record will then turn at the proper speed to produce the required number of beats per minute.

If the number of beats required is over 126 per minute, the other side of the record may be used, on which side there are two impressions at one-half of the number indicating the number of beats. If the tempo is expressed by means of a word, the student can determine the number of beats per minute by referring to the table printed on the record (as at 15), and can set the machine to correspond to the correct number of beats.

In determining the point at which the time indicator is to be set to produce a certain time, the student may calculate from the central position. On one side of the record, the center of time will be at larghetto, and on the other side, at allegro. A special time indicator may be used on the phonograph, on which the indicating dial has its markings expressed in the musical terms and metronome numbers.

By the use of one record any number of beats per second may be produced. However, there are several different tempos at which the number of beats per second are the same, for instance, in 2/2 time and 4/4 time, the number of beats per second are the same. There is a difference between these tempos, however, in view of the fact that in the 2/2 time, it is desirable to accent every other beat, as the first beat of a measure, and in the 4/4 time, it is desirable to accent the first beat strongly and the third beat less strongly.

In Figure 4, I have shown a section of record showing the impressions necessary to count 2/2 time and in Figure 6, the impressions necessary to count 4/4 time. In 3/4 time, the first beat is heavily accented and the last two beats are not accented, and the section of the record having such time, is shown in Figure 5.

The desirability of being able to accent one or more of the beats in a measure, is very manifest. In the first place, the pupil is enabled to determine when the beginning of each measure arrives and in the second place, when the student is listening to a human voice counting the beats in such a manner, he will feel the rhythm of the music and will thus be helped along in playing it.

The following records comprise a collection which contains practically every variation of tempo and rhythm.

1. A record with no accents but just the beats which would answer for any time only it lacks rhythm.

2. A record with two counts to a measure, accent on count one. This record is for ¢, 2/1, 2/2, 2/4, 2/8 time.

3. A record with three counts to a measure, accent on count one. This record is for 3/1, 3/2, 3/4, 3/8, 3/16 time.

4. A record with four counts to a measure, the primary accent being on count one and the secondary accent being on count three. This record is for ¢, 4/2, 4/4, 4/8, 4/16 time.

5. A record with six counts to a measure, the primary accent being on count one, and the secondary accent on count four. This record is for 6/2, 6/4, 6/8, 6/16 time.

6. A record with nine beats to a measure, the primary accent being on count one, and the secondary accent on count four and seven. This record is for 9/4, 9/8, 9/16 time.

7. A record with twelve beats to a measure, the primary accent being on count one and the secondary accents on count four, seven, and ten. In this there are three shades of accent, the strongest on count one, a slight accent on four, a little stronger on seven, and slight on ten. This record is for 12/4, 12/8, 12/16 time.

8. A record for 5/4, 5/8 time.

9. Two other records could be made for 8/8, and 24/16 time, although there is little demand for such, also any of the above records may be made with the word "and" after each count for the half beat.

10. A record showing how to count different groups of notes, this record playing various groups of notes in succession and which groups will include various combinations of notes of different lengths, the accented beat produced by the triangle or voice will also be reproduced on the record simultaneously with the groups of notes in order to enable the pupil to determine where the accent will appear in each group of notes. This record may be used in connection with a chart illustrating the groups of notes in print.

My device may be used in conjunction with a chart, on which various combinations and groups of notes are printed, with a numeral to indicate each beat. This numeral may be placed under the note which receives that beat.

A special record may be made for recording tones of any instrument, with the count also. The pupil may then get the tone on his own instrument and count with the record. On such records, at least four measures should be provided for each exercise and each exercise should have a consecutive number spoken on the record to enable the pupil to find the exercise exemplifying the time to be practiced.

With even the best metronome, all that can be procured is an unsatisfactory bell used with the beat, to give the primary accent, without any means for receiving secondary accent, while with the use of my device, the pupil is made to feel the rhythm of the piece as much as if he had his instructor before him directing him in person.

It is obvious that my invention can be applied to any form of phonograph record such as the type in which the vibrations are impressed upon the record in the vertical waves 17, rather than horizontal, such as shown in Figures 8 and 9. I have found that the use of a triangle, which produces a clear, ringing, tone is very nearly as effective as the human voice in counting time and the modifications of tone to produce accents, may be accomplished on a triangle.

My device is much more inexpensive than a metronome since one record with a double face can be used to produce the same results as a metronome and the price of such a record is less than one-fourth as much. With a half dozen records which will not total any more than the expense of an ordinary metronome, any sort of time may be produced and any kind, or speed of time may be produced. The record is such that it may be filed away and kept in a convenient place where it is safe and out of the way, and will ordinarily last much longer than a metronome.

The pupil can readily determine the proper speed at which to operate the machine in order to produce the correct tempo. The quality of the human voice is such as to attract the attention and enliven the interest of the student while using the record, while the monotony of the metronome tends to make practicing more burdensome. The importance of producing rhythm for the pupil to follow rather than merely dead meter cannot be over emphasized.

The metronome can only be used for music, while my device may be employed in teaching marching, drilling, dancing, and writing lessons and typewriting.

Some changes may be made in the construction and arrangement of the various parts of my invention, without departing from the real spirit and purpose of my invention and it is my intention to cover by my claim, any modified forms of structure or use of mechanical equivalents, which may be reasonably included within its scope.

In the claim, I desire to have it understood that I use the term "beat" in the sense of beat or count.

I claim as my invention:

In a device of the class described, a phonograph record having impressions thereon for reproducing the sound in a succession of accented and unaccented beats, the impressions being so disposed that a simple ratio will exist between the number of revolutions of a phonograph turn table and the number of beats produced by the record while revolving said number of revolutions, whereby the number of beats per second may be regulated and determined by the speed regulator of the phonograph.

Des Moines, Iowa, October 27, 1922.

ADELAIDE L. EWING.